United States Patent
Kobayashi et al.

(10) Patent No.: US 8,958,968 B2
(45) Date of Patent: Feb. 17, 2015

(54) TRACTION CONTROL DEVICE AND METHOD FOR A MOTORCYCLE

(71) Applicant: Honda Motor Co., Ltd., Minato-Ku, Tokyo (JP)

(72) Inventors: Fuyuki Kobayashi, Saitama (JP); Yoichiro Fukao, Saitama (JP); Yohei Maruyama, Saitama (JP); Tatsuya Ito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 154 days.

(21) Appl. No.: 13/836,090

(22) Filed: Mar. 15, 2013

(65) Prior Publication Data

US 2013/0261925 A1  Oct. 3, 2013

(30) Foreign Application Priority Data

Mar. 30, 2012 (JP) .................................. 2012-081666

(51) Int. Cl.
   *G06F 19/00* (2011.01)
   *B60K 28/16* (2006.01)

(52) U.S. Cl.
   USPC .................. 701/85; 701/36; 701/71; 701/48; 701/69; 701/70; 701/74; 701/79; 701/82; 701/84; 701/90; 303/163; 303/164; 180/197

(58) Field of Classification Search
   USPC .......... 701/85, 36, 71, 48, 69, 70, 74, 79, 82, 701/84, 90; 303/163, 164; 180/197
   See application file for complete search history.

(56) References Cited

U.S. PATENT DOCUMENTS

| | | | |
|---|---|---|---|
| 8,244,443 B2* | 8/2012 | Oshima et al. | 701/71 |
| 8,452,512 B2* | 5/2013 | Oshima et al. | 701/90 |
| 8,554,439 B2* | 10/2013 | Oshima et al. | 701/82 |
| 2009/0326769 A1* | 12/2009 | Oshima et al. | 701/51 |
| 2009/0326779 A1* | 12/2009 | Oshima et al. | 701/86 |
| 2010/0017077 A1* | 1/2010 | Oshima et al. | 701/51 |
| 2012/0191309 A1* | 7/2012 | Oshima et al. | 701/51 |

FOREIGN PATENT DOCUMENTS

JP   2011-137427 A   7/2011

* cited by examiner

*Primary Examiner* — Ronnie Mancho
(74) *Attorney, Agent, or Firm* — Carrier Blackman & Associates, P.C.; Joseph P. Carrier; William D. Blackman (57) ABSTRACT

A traction control device for a motorcycle eliminates a need for a waiting time for detecting an amount of change in a vehicle state and a subsequent prediction time, and can execute quick traction control. The traction control device includes an engine driving force control unit, for calculating a real slip ratio of the motorcycle, setting a target slip ratio according to a driving state of the motorcycle, and controlling a driving force of an engine so that the real slip ratio becomes the target slip ratio. The traction control device also includes a throttle grip opening degree sensor for detecting an opening degree of a throttle grip; and a bank angle sensor for detecting a bank angle of the motorcycle. The engine driving force control unit calculates the target slip ratio on a basis of the throttle opening degree and the bank angle of the motorcycle.

20 Claims, 11 Drawing Sheets

TRACTION CONTROL DEVICE AND METHOD FOR A MOTORCYCLE

CROSS-REFERENCE TO RELATED APPLICATIONS

The present invention claims priority under 35 USC 119 based on Japanese patent application No. 2012-081666, filed Mar. 30, 2012. The entire subject matter of this priority document, including specification claims and drawings thereof, is incorporated by reference herein.

BACKGROUND OF THE INVENTION

1. Field of the Invention

The present invention relates to a traction control device and method for a motorcycle, which improves stability and drivability of the motorcycle during cornering operation thereof.

2. Description of the Background Art Japanese Published Patent Document No. 2011-137427 describes a traction control system that makes the grip of a vehicle maintained by reducing the output of a driving wheel when the slip ratio of the vehicle exceeds a target slip ratio. The traction control system dynamically changes the target slip ratio according to a driving state (an amount of change in opening degree of a throttle, the slip ratio, an amount of change in engine rotational speed, and the like) of the vehicle, and thereby executes traction control immediately in a state of a high slip ratio of the vehicle and suppresses the execution of traction control in a state of a low slip ratio because a grip state is improving.

However, in some cases it is desirable to prevent the execution of traction control, such as when a driver is making the vehicle slip on purpose due to a large change in the degree of throttle opening.

In a case of preventing traction control from being executed even when the slip of a wheel occurs, it remains necessary to be able to execute quick control in a range where the slip is not large. However, the conventional control uses the slip ratio and the amount of change in throttle opening degree as parameters for the control. Thus, a delay is required before the amount of change is detected and a prediction time for predicting a subsequent state, such that quicker control may not be executed.

It is accordingly an object of the present invention to provide a traction control device and method for a motorcycle which eliminates the required delay in detecting the amount of change in vehicle state and the subsequent prediction time, such that the device can execute quick traction control.

SUMMARY OF THE INVENTION

Throughout the present specification, reference numbers refer to the exemplary structures shown in the drawings, and such numbers are intended to illustrate, rather than to limit the invention.

According to a first aspect of the invention, a traction control device (10) for a motorcycle, includes an engine driving force controller (116 and 140) for calculating a real slip ratio (Sr) of a vehicle (12), setting a target slip ratio (St) according to a driving state of the vehicle (12), and controlling a driving force of an engine (106) so that the real slip ratio (Sr) becomes the target slip ratio (St); throttle opening degree sensor (122) for detecting a throttle opening degree ($\theta$g) of a throttle grip (37); and bank angle sensor (128) for detecting a bank angle ($\theta$r) of the vehicle (12); wherein the engine driving force controller (116 and 140) calculates the target slip ratio (St) on a basis of the throttle opening degree ($\theta$g) and the bank angle ($\theta$r) of the vehicle (12).

According to a second aspect of the invention, the engine driving force controller (116 and 140) includes target torque setting unit (156) for setting a target torque (T) of the engine (106) from the target slip ratio (St) and the real slip ratio (Sr), and an output torque (Tr) of the engine (106) is reduced to become the target torque (T) by adjusting an opening degree ($\theta$th) of an inlet valve (104) disposed in an inlet path (102) of the engine (106) and adjusting ignition timing of the engine (106), whereby traction control for making the real slip ratio (Sr) converge to the target slip ratio (St) is executed.

According to a third aspect of the invention, a target value of the target slip ratio (St) is set as a slip ratio based on a ratio between a rotational speed (Rf) of a driven wheel (20) and a rotational speed (Rr) of a driving wheel (28), the target slip ratio (St) is set by a map search using a slip ratio map (170) having the throttle opening degree ($\theta$g) and the bank angle ($\theta$r) as parameters, and the slip ratio map (170) is recorded in a memory (140) of the engine driving force controller (116 and 140) in a rewritable manner.

According to a fourth aspect of the invention, the target torque setting unit (156) uses sliding mode control.

According to a fifth aspect of the invention, the target torque setting unit (156) has vehicle speed feedback control for calculating the target torque (T) on a basis of a difference between the target slip ratio (St) and the real slip ratio (Sr) calculated on a basis of an estimated vehicle body speed and speed of a driving wheel, and engine rotational speed feedback control for setting a target engine rotational speed (NE1) on a basis of the target slip ratio (St) and calculating the target torque (T) on a basis of a difference between the target engine rotational speed (NE1) and a real engine rotational speed (NE2), and one of the vehicle speed feedback control and the engine rotational speed feedback control is used according to a driving state of the vehicle.

According to a sixth aspect of the invention, the traction control device (10) for the motorcycle further includes transmission gear sensor (130) for detecting a transmission gear, wherein the target torque setting unit (156) uses the engine rotational speed feedback control when the transmission gear is a predetermined low gear or a lower gear.

According to a seventh aspect of the invention, the traction control device (10) for the motorcycle further includes lateral G sensor (134) for detecting lateral G acceleration of the vehicle, wherein the engine driving force controller (116 and 140) sets a lateral G driving force limit value on a basis of the detected lateral G acceleration.

According to an eight aspect of the invention, the engine driving force controller (116 and 140) compares the target torque (T) with the lateral G driving force limit value, and sets the target torque (T) to the lateral G driving force limit value when the target torque (T) is higher than the lateral G driving force limit value.

According to a ninth aspect of the invention, the lateral G driving force limit value is determined on a basis of a limit driving force based on the lateral G acceleration and an amount of stroke of a front suspension (18).

According to a tenth aspect of the invention, the engine driving force controller (116 and 140) includes wheelie sensor (162) for detecting a wheelie, and when a wheelie is performed, a subtraction torque quantity according to a pitch angle (Op) is subtracted from a torque requested by a user.

According to an eleventh aspect of the invention, the subtraction torque quantity is determined according to the pitch angle (Op) and a pitch angular velocity.

Based on the first aspect of the invention, the target slip ratio is calculated on the basis of the throttle opening degree and the bank angle of the vehicle. Thus, the target slip ratio can be calculated from parameters at a moment of operation by the driver. Therefore traction control can be performed from a state of operation itself by the driver rather than from a change in state. As a result, quick control is made possible, a need for a control time to perform prediction from a change in state as in the past is eliminated, and traction control suitable for motorcycles suited to sports runs and race runs can be performed.

Based on the second aspect of the invention, because the slip ratio map is recorded in the memory in a rewritable manner, traction control suiting the preferences of the owner can be performed, and drivability is improved.

Based on the third aspect of the invention, the opening degree of the inlet valve in the inlet path and the ignition timing are adjusted so as to generate the target torque set from the target slip ratio and the real slip ratio. Thus, the output of the engine can be adjusted automatically when only the target torque is set. In addition, a share for the adjustment of the opening degree of the inlet valve and a share for the adjustment of the ignition timing can be changed according to the conditions of the engine.

Based on the fourth aspect of the invention, the target torque setting unit uses sliding mode control. Thus, resistance to disturbance is enhanced, and the target torque can be set quickly.

Based on the fifth and sixth aspects of the invention, it is recognized that in a power transmission system from the engine to the driving wheel, there are effects of chain slack and backlash of transmission gears. In a low transmission gear in which a high torque is generated, the effects are great, and therefore the target torque can be set accurately by engine rotational speed feedback control rather than vehicle speed feedback control.

Based on the seventh and eighth aspects of the invention, the lateral G driving force limit value is set for the vehicle when the vehicle is banked. Thus, appropriate output control can be performed in the middle of a cornering run. In addition, appropriate output control can be performed also in a case where traction control is performed when the vehicle is banked.

Based on the ninth aspect of the invention, the lateral G driving force limit value can be set on the basis of the limit driving force based on the lateral G acceleration and the amount of stroke of the front suspension. Thus, an efficient output limitation can be applied at a time of a cornering run or the like.

Based on the tenth aspect of the invention, because the driven wheel is off the ground when a wheelie is performed, the motorcycle can be driven more desirably by applying an output limitation according to the pitch angle.

Based on the eleventh aspect of the invention, the subtraction torque quantity is determined according to the pitch angle and the pitch angular velocity. Therefore the subtraction torque quantity can be determined suitably.

DETAILED DESCRIPTION

A traction control device for a motorcycle according to the present invention will hereinafter be described in detail by providing a preferred embodiment thereof with reference to the accompanying drawings.

Figure 1:
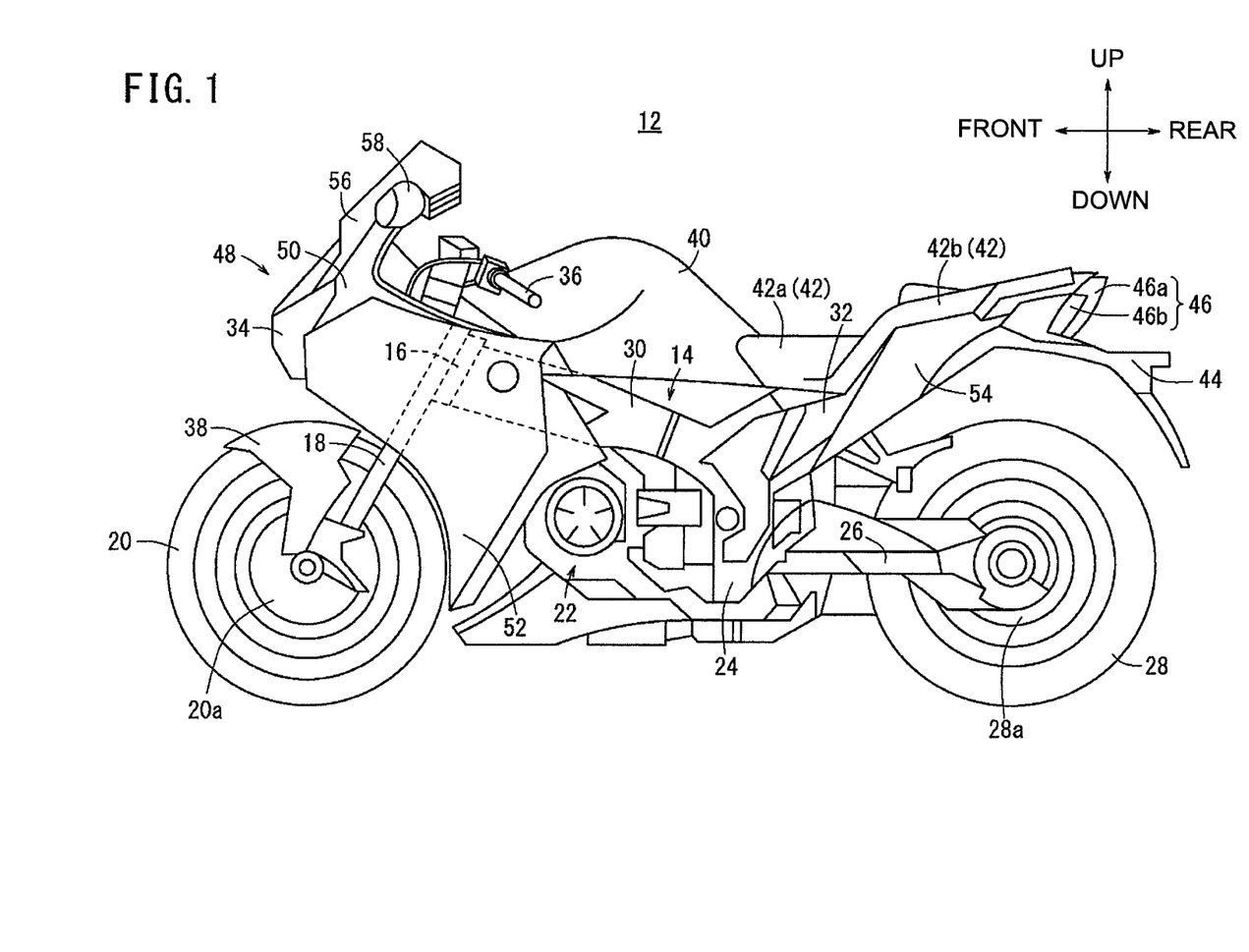
FIG. 1 is an external left side view of a motorcycle mounted with a traction control device for a motorcycle according to an embodiment.

FIG. 1 is an external left side view of a motorcycle (including a motor-assisted bicycle) 12 mounted with a traction control device for a motorcycle (which device will hereinafter be referred to as a traction control device) 10 according to an embodiment. Incidentally, in order to facilitate understanding of the invention, unless otherwise specified, a frontward and a rearward direction and an upward and a downward direction will be described with respect to the directions of arrows shown in FIG. 1, and a left and a right direction will be described with respect to a direction as viewed from a driver seated on a vehicle body.

The motorcycle (vehicle) 12 includes: a vehicle body frame 14 forming a vehicle body; a pair of left and right front fork members (front suspension) 18 rotatably supported by a head pipe 16 disposed in the front end portion of the vehicle body frame 14; a front wheel (driven wheel) 20 attached to the front fork members 18; a power unit 22 composed of an engine 106 as a driving source of the motorcycle 12 and an automatic transmission 114 (see FIG. 2), the power unit 22 being supported by the vehicle body frame 14; a swing arm 26 swingably supported by a pivot portion 24 as the lower portion of the vehicle body frame 14; and a rear wheel (driving wheel) 28 attached to the rear end portion of the swing arm 26. The front fork members 18 have a hydraulic damper to reduce vibration transmitted from a ground surface.

The vehicle body frame 14 includes: a pair of left and right main frames 30 extending from the head pipe 16 in an obliquely downward direction; a pair of left and right pivot portions 24 connected to the rear parts of the pair of left and right main frames 30 and extending out downwardly; and a pair of left and right seat frames 32 attached to the rear portions of the main frames 30 and extending rearward in an obliquely upward direction.

A headlight 34 for irradiation in a frontward direction of the vehicle body is disposed in front of the head pipe 16. Bar-shaped handlebars 36 allowing the front wheel 20 to be steered are attached above the head pipe 16. Grips to be gripped by the driver are disposed on both sides of the handlebars 36. The grip on the right side is a throttle grip (acceleration instruction unit) 37 (see FIG. 2), which is rotatable on the shaft of the handlebars 36, and gives an instruction for acceleration (to raise the rotational speed of the engine).

The front wheel 20 is rotatably supported by the lower end portions of the front fork members 18. A front wheel brake device (disk brake) 20a for applying a braking force to the front wheel 20 is mounted on the side of the front wheel 20. In addition, a front fender 38 covering the front wheel 20 from above is attached to the lower end portions of the front fork members 18.

The power unit 22 is fixed and supported by the main frames 30 and the pivot portions 24. The swing arm 26 extends substantially horizontally from the pivot portions 24 to the rear. The rear end portion of the swing arm 26 rotatably supports the rear wheel 28. A rear wheel brake device (disk brake) 28a for applying a braking force to the rear wheel 28 is mounted on the side of the rear wheel 28.

A fuel tank 40 is disposed above the power unit 22. A seat 42 for carrying occupants is disposed on the seat frames 32 and in the rear of the fuel tank 40. A so-called tandem type seat composed of a front seat 42a to be taken by the driver and a rear seat 42b to be taken by a passenger in the rear of the front seat 42a is used as the seat 42. A rear fender 44 extending rearward and extending in an obliquely downward direction from the lower side of the rear portions of the seat frames 32 is attached to the rear portions of the seat frames 32. A taillight unit 46 is attached to the rear of the seat 42. The taillight unit 46 includes a brake lamp 46a and a rear side turn signal lamp 46b.

A vehicle body cover 48 forming the design (external appearance) of the vehicle body is attached to the motorcycle 12 in a longitudinal direction of the vehicle body. The vehicle body cover 48 includes: a front cover 50 covering the front portion of the vehicle body; a pair of left and right side cowls 52 extending in a rearward direction from both sides of the headlight 34; and a rear cowl 54 extending in a rearward and upward direction together with the seat frames 32 and covering both sides of the seat frames 32. A screen 56 is disposed on the upper portion of the front cover 50. A front side turn signal lamp 58 is attached to the left and right of the front cover 50.

Figure 2:
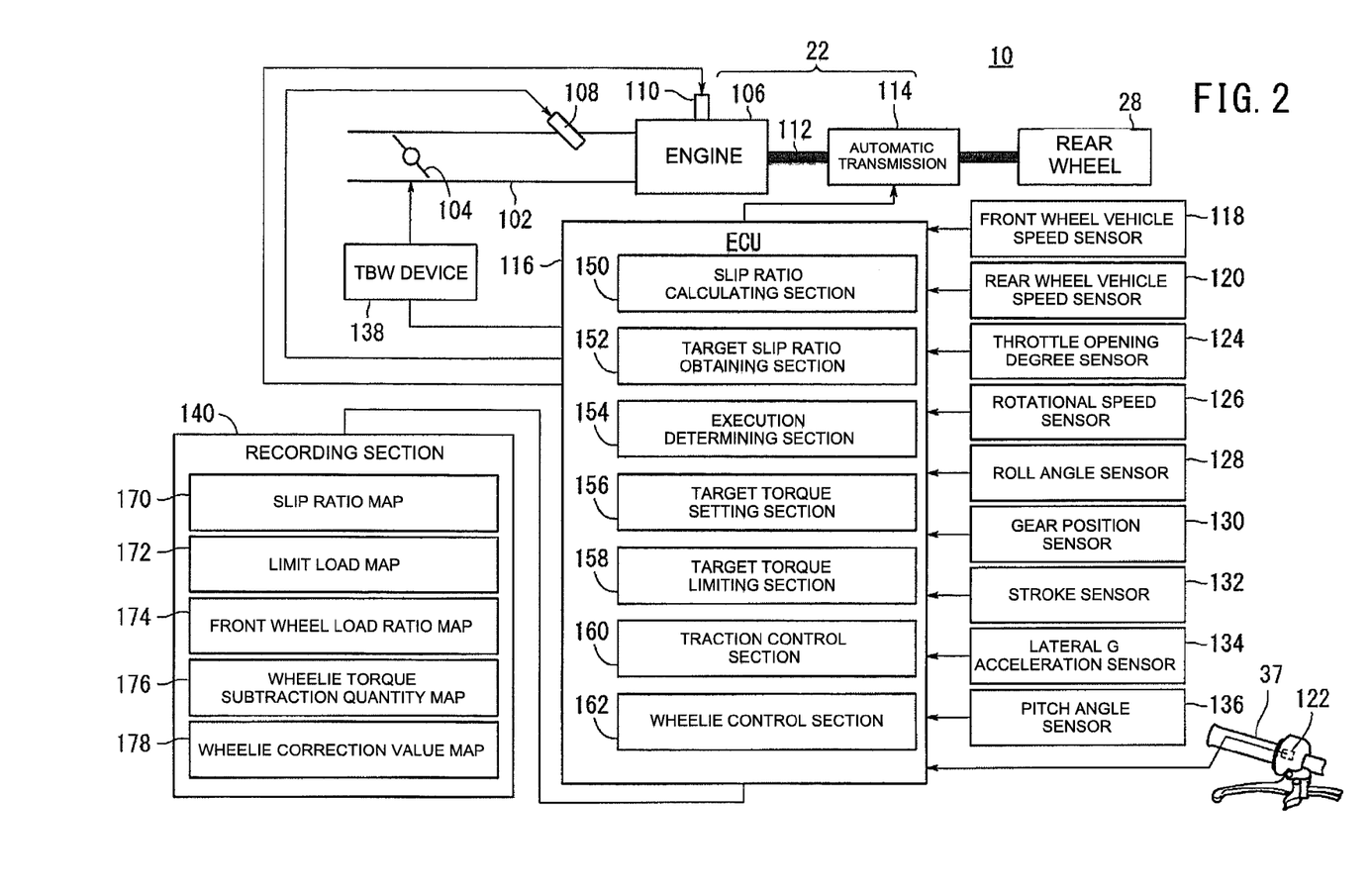
FIG. 2 is a block diagram of the traction control device for the motorcycle.

FIG. 2 is a block diagram of the traction control device 10. A throttle valve (inlet valve) 104 disposed in an inlet pipe (inlet path) 102 adjusts an amount of air supplied to the engine 106 of the power unit 22 according to an opening degree θth. That is, as the opening degree θth of the throttle valve 104 is increased, the amount of air supplied to the engine 106 by the throttle valve 104 is increased. In addition, the inlet pipe 102 is provided with an injector (fuel injecting unit) 108 for injecting a fuel into the air flowing into the combustion chamber of the engine 106 via the throttle valve 104, and thereby generating a mixture.

The engine 106 is provided with a spark plug (igniting unit) 110 for igniting the mixture flowing into the combustion chamber. When the spark plug 110 effects ignition, the mixture present within the combustion chamber burns, and the engine 106 converts combustion energy into power. An amount of fuel injected from the injector 108 is controlled so that a ratio between the air and the fuel of the mixture flowing into the combustion chamber of the engine 106 is a predetermined ratio.

The turning force of a crankshaft 112 as the output shaft of the engine 106 is transmitted to the rear wheel 28 via the automatic transmission (transmission) 114. The automatic transmission 114 has a plurality of transmission gears. A transmission gear is automatically selected by an ECU 116 according to a vehicle speed and the opening degree (θg) of the throttle grip 37 or the opening degree (θth) of the throttle valve 104, so that the transmitted turning force is transmitted to the rear wheel 28 with a transmission gear ratio (speed reduction ratio) changed. Incidentally, the transmission may be a manual transmission allowing a gear to be selected by operation of the driver.

The traction control device 10 includes: a front wheel vehicle speed sensor (vehicle speed sensor) 118 for detecting the rotational speed Rf of the front wheel 20 (information on the vehicle speed of the motorcycle 12); a rear wheel vehicle speed sensor (vehicle speed sensor) 120 for detecting the rotational speed Rr of the rear wheel 28 (information on the vehicle speed of the motorcycle 12); a throttle grip opening degree sensor (throttle opening degree sensor) 122 for detecting the opening degree θg of the throttle grip 37 (opening degree θg of the throttle); a throttle opening degree sensor 124 for detecting the opening degree θth of the throttle valve 104; a rotational speed sensor 126 for detecting the engine rotational speed NE of the engine 106 (rotational speed of the crankshaft 112); a roll angle sensor (bank angle sensor) 128 for detecting a roll angle (bank angle) θr as the bank angle of the motorcycle 12; a gear position sensor (transmission gear sensor) 130 for detecting the currently connected transmission gear of the automatic transmission 114; a stroke sensor 132 for detecting the amount of stroke of the front fork members 18; a lateral G acceleration sensor (lateral G sensor) 134 for detecting lateral G acceleration; and a pitch angle sensor 136 for detecting a pitch angle θp. The various sensors perform detection according to control of the ECU 116.

A TBW (Throttle-By-Wire) device 138 performs throttle-by-wire control for operating the opening degree θth of the throttle valve 104 of the engine 106 under control of the ECU 116. The throttle-by-wire control adjusts the opening degree θth of the throttle valve 104 of the engine 106 according to the opening degree θg of the throttle grip 37 which opening degree θg is detected by the throttle grip opening degree sensor 122. As the opening degree θg of the throttle grip 37 is increased, the opening degree θth of the throttle valve 104 is increased.

The ECU 116 performs centralized control of the whole of the motorcycle 12. The ECU 116 is formed by a computer of a CPU and the like. The ECU 116 functions as an ECU according to the present embodiment by reading a program recorded in a recording section 140. Incidentally, the ECU 116 and the recording section 140 function as engine driving force controlling unit according to the present invention. The ECU 116 in the present embodiment includes, in particular, a slip ratio calculating section 150, a target slip ratio obtaining section 152, an execution determining section 154, a target torque setting section (target torque setting unit) 156, a target torque limiting section 158, a traction control section 160, and a wheelie control section 162.

Figure 3:
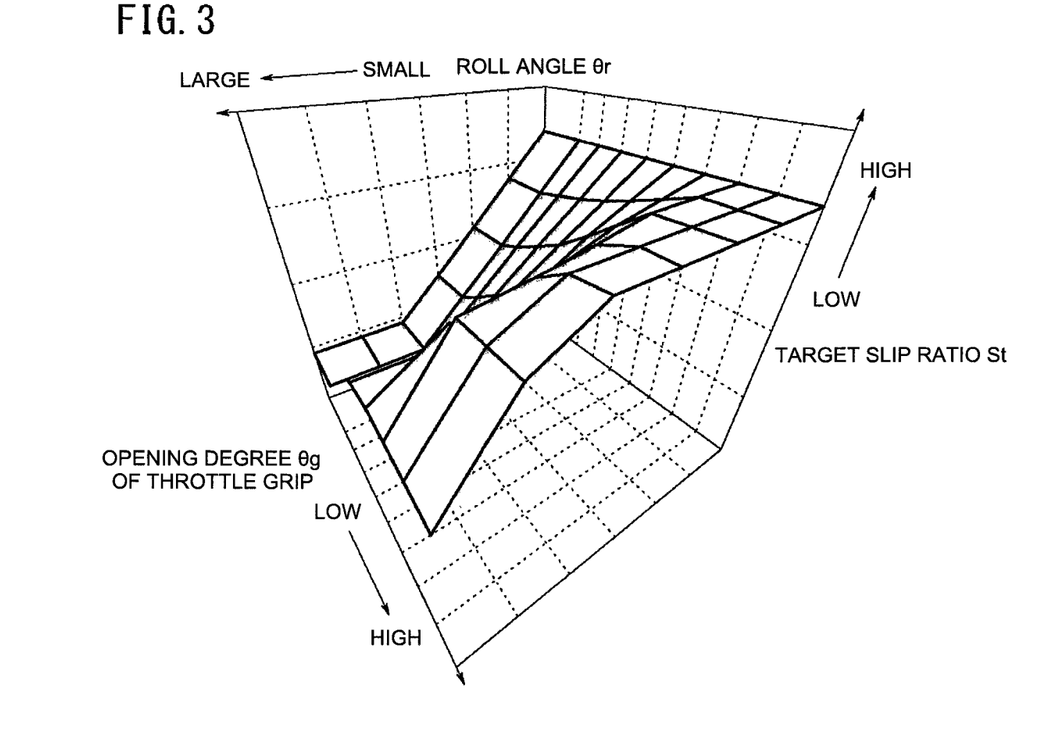
FIG. 3 is a diagram showing a slip ratio map shown in FIG. 2.
Figure 4:
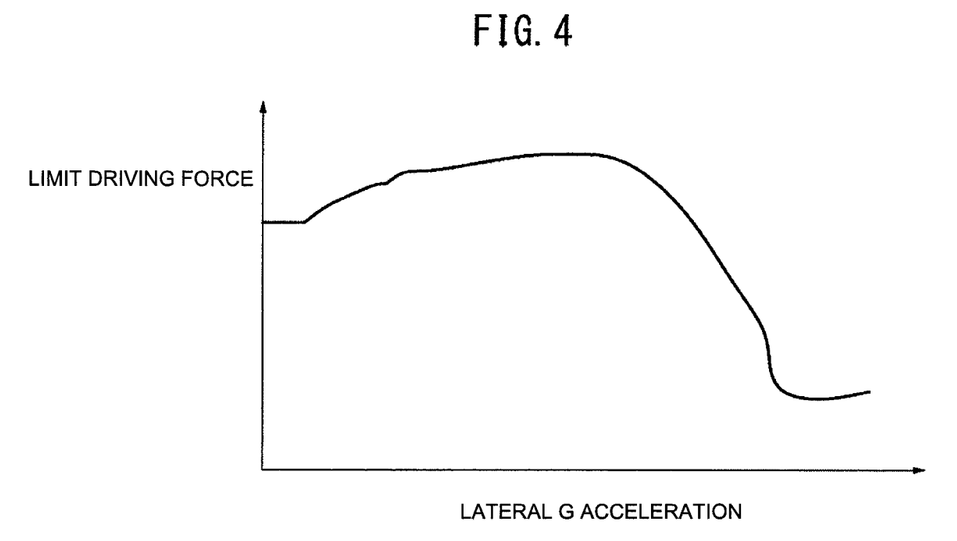
FIG. 4 is a diagram showing a limit load map shown in FIG. 2.
Figure 5:
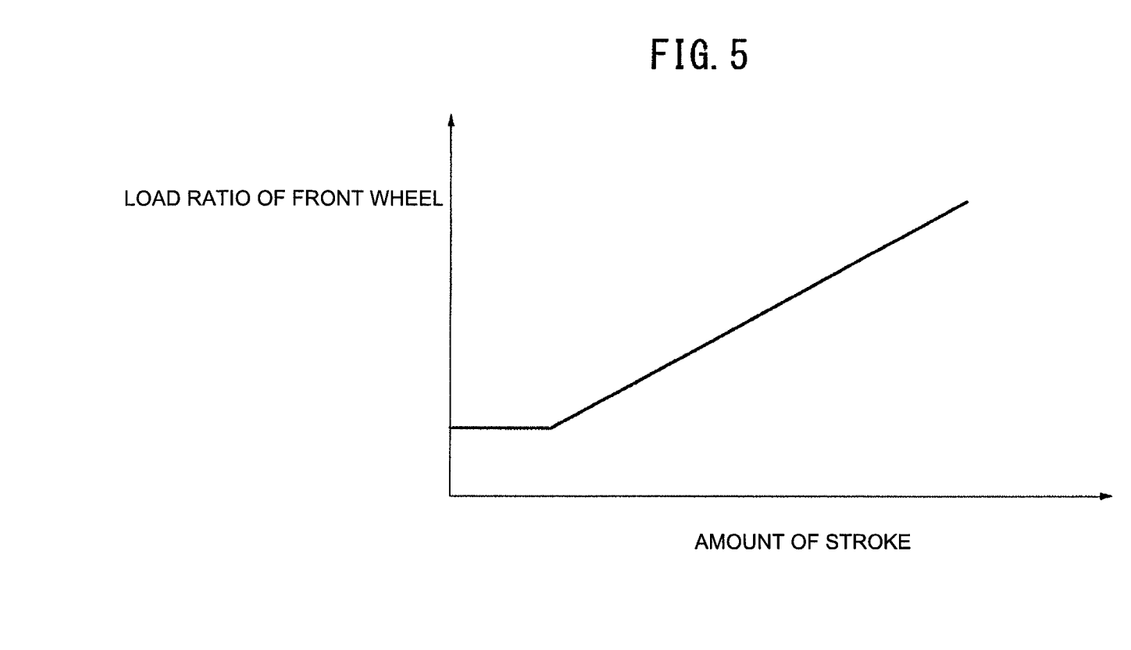
FIG. 5 is a diagram showing a front wheel load ratio map shown in FIG. 2.
Figure 6:
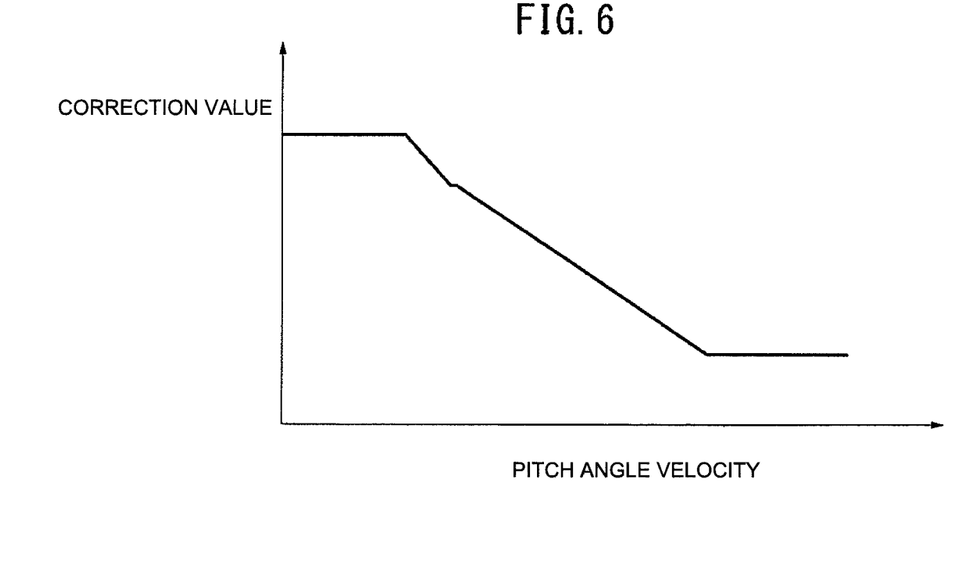
FIG. 6 is a diagram showing a wheelie correction value map shown in FIG. 2.

In addition to the program, the recording section (memory) 140 stores: a slip ratio map 170 on which a target slip ratio St according to the opening degree θg of the throttle grip 37 and the roll angle θr of the motorcycle 12 is recorded as shown in FIG. 3; a limit load map 172 on which limits according to the lateral G acceleration are recorded as shown in FIG. 4; a front wheel load ratio map 174 on which the load ratio of the front wheel 20 according to the amount of stroke of the front fork members 18 is recorded as shown in FIG. 5; a wheelie torque subtraction quantity map 176 on which a wheelie torque subtraction quantity according to the roll angle θr and the pitch angle θp is recorded; and a wheelie correction value map 178 on which a correction value according to a pitch angular velocity is recorded as shown in FIG. 6.

The slip ratio map 170 is set in advance according to the driving pattern of the driver using the motorcycle 12 (inclinations or preferences of driving of the driver). That is, the target slip ratio St according to the opening degree θg and the roll angle θr which target slip ratio St is stored on the slip ratio map 170 is set according to the driving pattern of the driver. The slip ratio map 170 according to the driving pattern of the driver can be set by measuring the driving operation of the motorcycle 12 by the driver in advance. This slip ratio map 170 is rewritable.

The limit load map 172 is set such that a limit driving force is gradually increased as the lateral G acceleration is increased and such that the limit driving force is decreased sharply when the lateral G acceleration exceeds a certain value. The load ratio of the front wheel 20 on the front wheel load ratio map 174 represents a ratio of a load imposed on the front wheel 20 to a total load imposed on the front wheel 20 and the rear wheel 28. The load ratio of the front wheel 20 and the load ratio of the rear wheel 28 becomes one when added together. The front wheel load ratio map 174 is set such that the load ratio of the front wheel 20 is gradually increased in proportion to the amount of stroke when the amount of stroke exceeds a certain value. The wheelie torque subtraction quantity map 176 is set such that the wheelie torque subtraction quantity becomes a larger value as the roll angle θr is increased and as the pitch angle θp is increased. The wheelie correction value map 178 is set such that the wheelie correction value is decreased in inverse proportion to pitch acceleration within a certain range of the pitch acceleration.

The slip ratio calculating section (slip ratio calculating unit) 150 calculates the actual slip ratio (real slip ratio) Sr of the motorcycle 12 on the basis of results of detection of the front wheel vehicle speed sensor 118 and the rear wheel vehicle speed sensor 120. For example, the slip ratio calculating section 150 obtains an estimated vehicle body speed from the rotational speed Rf of the front wheel 20 which rotational speed Rf is detected by the front wheel vehicle speed sensor 118 and the rotational speed Rr of the rear wheel 28 which rotational speed Rr is detected by the rear wheel vehicle speed sensor 120, obtains the speed of the rear wheel 28 from the rotational speed Rr of the rear wheel 28, and calculates the real slip ratio Sr from the estimated vehicle body speed and the speed of the rear wheel 28 or the like. The method of calculating the real slip ratio Sr is a well known technique. The real slip ratio Sr may be calculated by another method. In addition, the method of calculating the estimated vehicle body speed is a well known technique, and therefore description thereof will be omitted.

The target slip ratio obtaining section 152 obtains, from the slip ratio map 170, the target slip ratio St according to the opening degree θg of the throttle grip 37 which opening degree θg is detected by the throttle grip opening degree sensor 122 and the roll angle θr of the motorcycle 12 which roll angle θr is detected by the roll angle sensor 128.

The execution determining section 154 determines whether to execute traction control. Specifically, when the real slip ratio Sr calculated by the slip ratio calculating section 150 exceeds the target slip ratio St obtained by the target slip ratio obtaining section 152, the execution determining section 154 determines that traction control is to be executed. When the real slip ratio Sr does not exceed the target slip ratio St, the execution determining section 154 determines that traction control is not to be executed.

The target torque setting section (target torque calculating unit) 156 calculates a target torque T using sliding mode control when the execution determining section 154 determines that traction control is to be executed. For example, the target torque setting section 156 calculates the target torque T of the engine 106 using sliding mode control from the real slip ratio Sr calculated by the slip ratio calculating section 150 and the target slip ratio St obtained by the target slip ratio obtaining section 152. That is, the target torque setting section 156 calculates the target torque T of the engine 106 so that the real slip ratio Sr decreases to the target slip ratio St.

The sliding mode control is response designation type control allowing the convergence speed of a controlled variable to be designated. In brief, the sliding mode control is a control method of switching control above and below a hyperplane set in advance as a subspace within a state space (which hyperplane is a surface dividing a space into two parts) (μ+ above the hyperplane and μ− below the hyperplane) such that a state is confined to the hyperplane. The motion trajectory of a control object is confined to the hyperplane, and the motion trajectory after reaching the hyperplane slides on the hyperplane (which is referred to as a sliding mode). This enables robust control with high responsivity and with high resistance to disturbance. This sliding mode control is a well known technique, and therefore description thereof will be omitted. Because the target torque T is calculated by the sliding mode control, the real slip ratio Sr can be made to converge to the target slip ratio St in a shorter time than other feedback control.

The target torque limiting section 158 determines whether the target torque T is higher than a lateral G driving force limit value. When the target torque T is higher than the lateral G driving force limit value, the target torque limiting section 158 limits the target torque T to the lateral G driving force limit value. The calculation of the lateral G driving force limit value will be described later.

When the execution determining section 154 determines that traction control is to be executed, the traction control section 160 executes traction control by controlling at least one of the throttle valve 104 and the spark plug 110 so that the output torque Tr of the engine 106 (torque of the crankshaft 112) becomes the target torque T calculated by the target torque setting section 156 or the target torque T limited by the target torque limiting section 158. The traction control suppresses a state of slipping of the front wheel 20 and the rear wheel 28 by reducing the output of the engine 106.

The traction control section 160 reduces the driving force of the engine 106 by adjusting at least one of the ignition timing of the spark plug 110 and the opening degree θth of the throttle valve 104. For example, the traction control section 160 reduces the driving force (output torque Tr) of the engine 106 by advancing or retarding the ignition timing and/or decreasing the opening degree θth of the throttle valve 104. The traction control section 160 drives the throttle valve 104 by controlling the TBW device 138, and thus controls the opening degree θth of the throttle valve 104. A share for adjustment of the opening degree θth of the throttle valve 104 and a share for adjustment of the ignition timing are changed according to the conditions and state of the engine 106. For example, the driving force of the engine 106 is reduced by greatly adjusting the opening degree θth of the throttle valve 104 and slightly adjusting the ignition timing when the engine 106 is in a certain state.

Incidentally, when the opening degree θth of the throttle valve 104 is decreased, the amount of air supplied to the engine 106 is reduced. The traction control section 160 may therefore reduce also an amount of fuel injection by controlling the injector 108 when reducing the opening degree θth of the throttle valve 104.

When the motorcycle 12 is performing a wheelie, the wheelie control section 162 executes wheelie control that reduces the output torque Tr of the engine 106 according to the degree of the wheelie. The operation of the wheelie control section 162 will be described later in detail.

Figure 7:
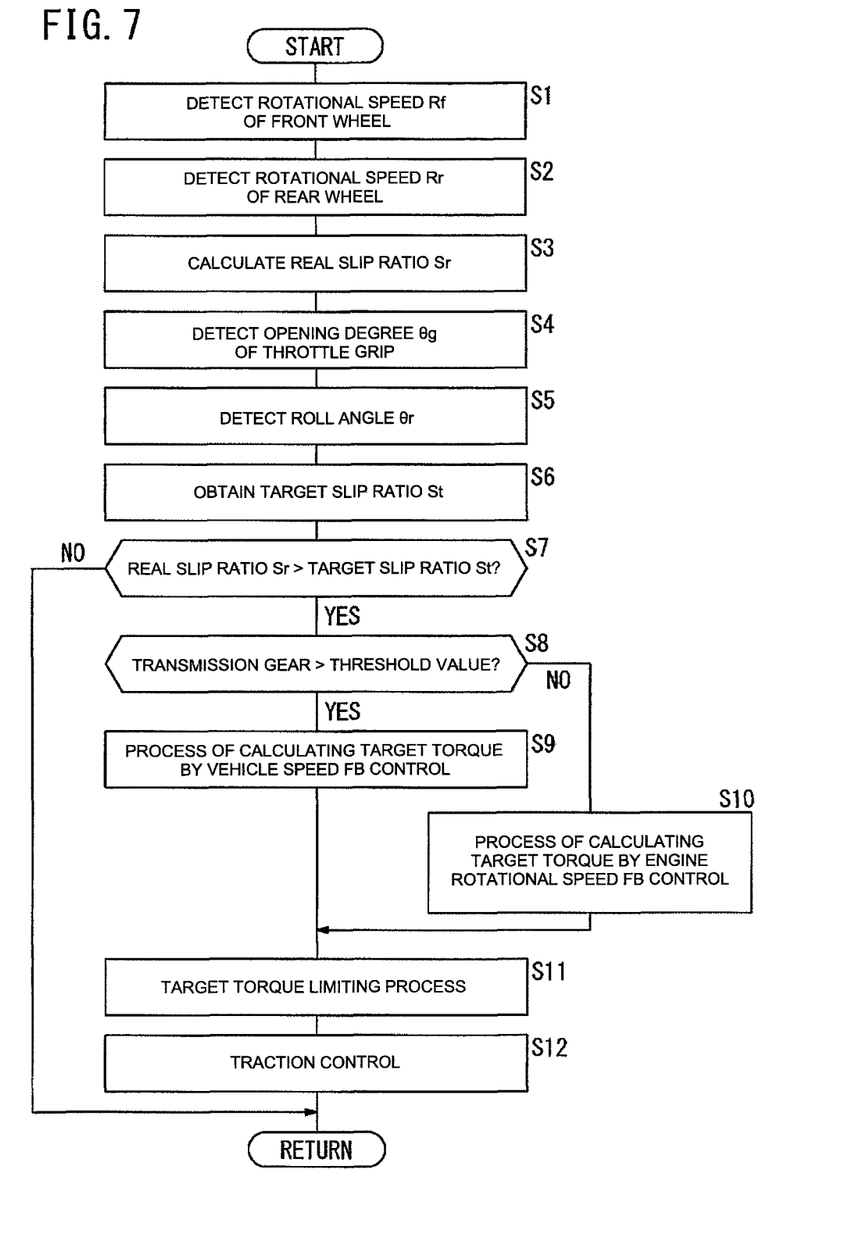
FIG. 7 is a flowchart depicting an operation of the traction control device.

The operation of the traction control device 10 will next be described with reference to a flowchart of FIG. 7. The operation shown in FIG. 7 is performed in certain cycles.

Under control of the ECU 116, the front wheel vehicle speed sensor 118 detects the rotational speed Rf of the front wheel 20 (step S1), and the rear wheel vehicle speed sensor 120 detects the rotational speed Rr of the rear wheel 28 (step S2).

Next, the slip ratio calculating section 150 calculates the real slip ratio Sr of the motorcycle 12 on the basis of results of detection of the front wheel vehicle speed sensor 118 and the rear wheel vehicle speed sensor 120 (step S3). Specifically, the slip ratio calculating section 150 obtains an estimated vehicle body speed on the basis of the rotational speed Rf of the front wheel 20 and the rotational speed Rr of the rear wheel 28, obtains the speed of the rear wheel 28 from the rotational speed Rr of the rear wheel 28, and calculates the real slip ratio Sr from the estimated vehicle body speed and the speed of the rear wheel 28 or the like.

Next, under control of the ECU 116, the throttle grip opening degree sensor 122 detects the opening degree $\theta g$ of the throttle grip 37 (step S4), and the roll angle sensor 128 detects the roll angle $\theta r$ of the motorcycle 12 (step S5).

Next, the target slip ratio obtaining section 152 obtains, from the slip ratio map 170, the target slip ratio St corresponding to the opening degree $\theta g$ of the throttle grip 37 which opening degree $\theta g$ is detected in step S4 and the roll angle $\theta r$ of the motorcycle 12 which roll angle $\theta r$ is detected in step S5 (step S6).

Next, the execution determining section 154 determines whether the real slip ratio Sr calculated in step S3 exceeds the target slip ratio St obtained in step S6 (step S7).

When determining in step S7 that the real slip ratio Sr exceeds the target slip ratio St, the execution determining section 154 determines that traction control is to be executed. When the real slip ratio Sr does not exceed the target slip ratio St, the execution determining section 154 determines that traction control is not to be executed.

When traction control is to be performed, the process proceeds to step S8, where the target torque setting section 156 determines whether a transmission gear detected by the gear position sensor 130 is higher than a threshold value (for example a second transmission gear).

When the gear position detected by the gear position sensor 130 is higher than the threshold value (for example the second transmission gear) in step S8, the target torque setting section 156 performs a process of calculating the target torque T by vehicle speed FB (feedback) control (step S9). When the gear position detected by the gear position sensor 130 is equal to or lower than the threshold value, the target torque setting section 156 performs a process of calculating the target torque T by engine rotational speed FB control (step S10). In a power transmission system from the engine 106 to the rear wheel 28, there are effects of chain slack and backlash of transmission gears of the automatic transmission 114.

In a low transmission gear in which a high torque is generated, the effects are great and the vehicle speed tends to change. Therefore, in a case of a low transmission gear, the target torque T can be set accurately when the target torque T is calculated by engine rotational speed feedback control rather than by vehicle speed feedback control. In a case of a high transmission gear, the target torque T can be set accurately when the target torque T is calculated by vehicle speed feedback control rather than by engine rotational speed feedback control. The process of calculating the target torque T by the vehicle speed FB control and the process of calculating the target torque T by the engine rotational speed FB control will be described later in detail.

After the target torque T is calculated, the target torque limiting section 158 performs a target torque limiting process (step S11). The target torque limiting section 158 limits the target torque T to the lateral G driving force limit value when the target torque T is higher than the lateral G driving force limit value. The target torque limiting section 158 does not limit the target torque T when the target torque T is equal to or lower than the lateral G driving force limit value. This target torque limiting process will be described later in detail.

Next, the traction control section 160 executes traction control by controlling at least one of the spark plug 110 and the throttle valve 104 on the basis of the target torque T after the target torque limiting process (step S12). The process then returns to step S1. This traction control controls at least one of the spark plug 110 and the throttle valve 104 so that the output torque Tr of the engine 106 becomes the target torque T. This traction control adjusts (advances or retards) the ignition timing of the spark plug 110, and adjusts (decreases) the opening degree $\theta th$ of the throttle valve 104, so that the driving force of the engine 106 can be reduced.

When it is determined that traction control is not to be executed, on the other hand, the process directly returns to step S1. When cycle timing arrives after the process returns to step S1, the above-described operation is performed.

Figure 8:
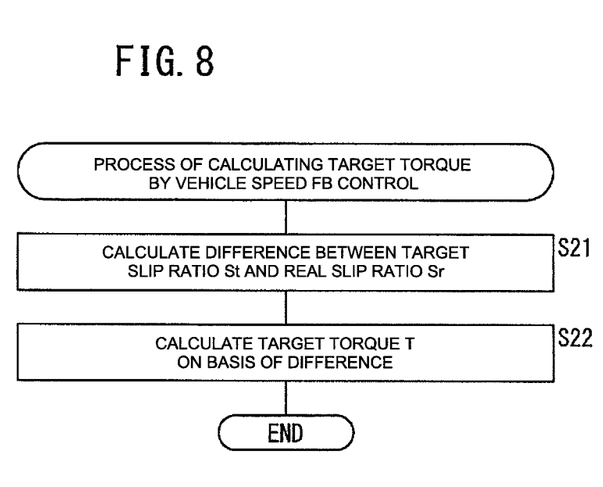
FIG. 8 is a flowchart depicting a process of calculating a target torque T by vehicle speed FB control.

The operation of the process of calculating the target torque T by vehicle speed FB control in step S9 of FIG. 7 will next be described with reference to a flowchart of FIG. 8.

First, a difference between the target slip ratio St obtained in step S6 of FIG. 7 and the real slip ratio Sr calculated in step S3 of FIG. 7 is calculated (step S21). The target torque T is calculated on the basis of the difference using the sliding mode (step S22).

Figure 9:
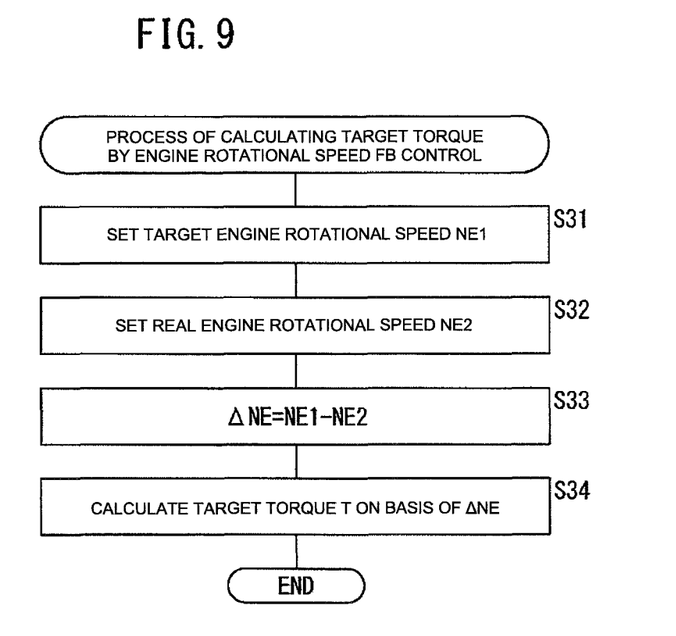
FIG. 9 is a flowchart depicting a process of calculating the target torque T by engine rotational speed FB control.

The operation of the process of calculating the target torque T by engine rotational speed FB control in step S10 of FIG. 7 will next be described with reference to a flowchart of FIG. 9.

First, a target engine rotational speed NE1 is set on the basis of the target slip ratio St obtained in step S6 of FIG. 7 (step S31). The target engine rotational speed NE1 is determined on the basis of the target slip ratio St, the transmission gear detected by the gear position sensor 130, and the estimated vehicle body speed.

Next, a real engine rotational speed NE2 is set on the basis of the real slip ratio Sr calculated in step S3 of FIG. 7 (step S32). Incidentally, the real engine rotational speed NE2 represents an actual engine rotational speed, and therefore the engine rotational speed detected by the rotational speed sensor 126 may be set as the real engine rotational speed NE2.

Next, a differential engine rotational speed $\Delta NE$, which is a difference between the target engine rotational speed NE1 and the real engine rotational speed NE2, is calculated (step S33). Specifically, the differential engine rotational speed $\Delta NE$ is calculated by subtracting the real engine rotational speed NE2 from the target engine rotational speed NE1.

Next, the target torque T is calculated on the basis of the differential engine rotational speed $\Delta NE$ using sliding mode control. That is, the target torque T of the engine 106 is calculated so that the real engine rotational speed NE2 becomes the target engine rotational speed NE1 (so that the real slip ratio Sr becomes the target slip ratio St).

Figure 10:
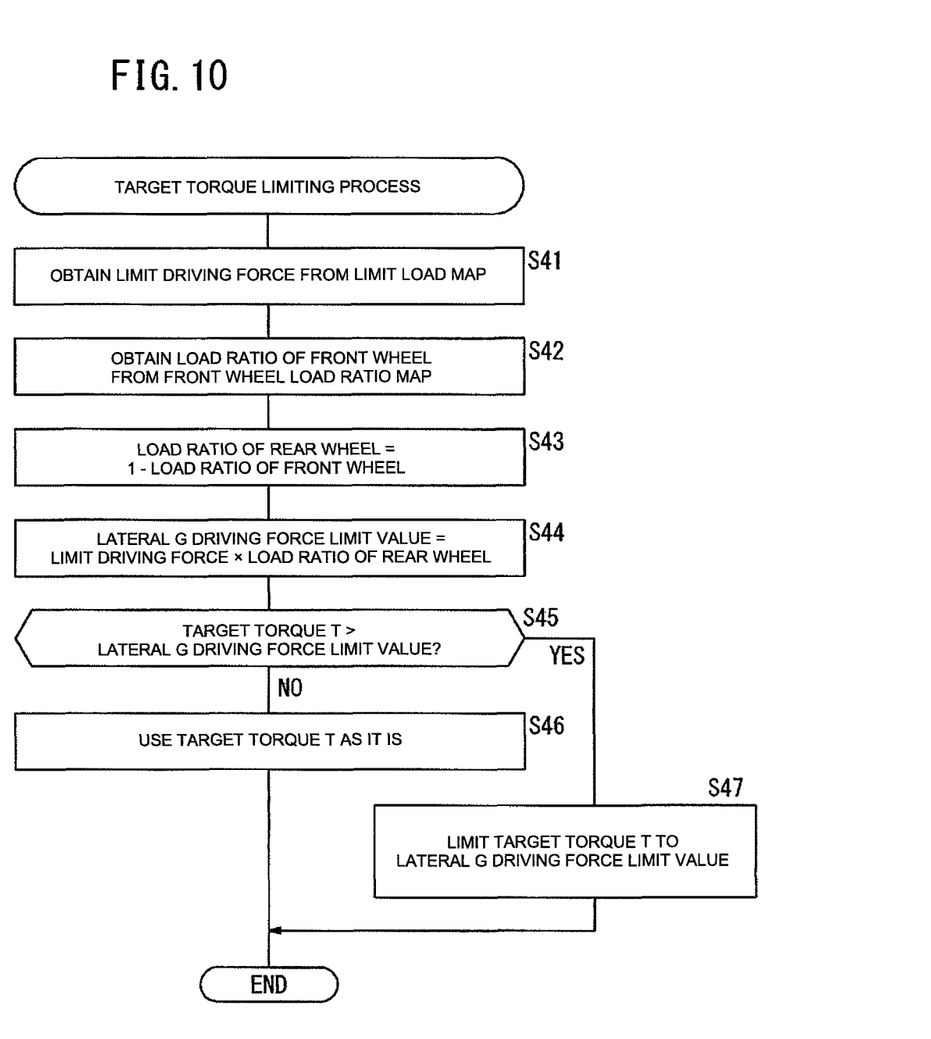
FIG. 10 is a flowchart depicting an operation of a target torque limiting process.

The operation of the target torque limiting process in step S11 of FIG. 7 will next be described with reference to a flowchart of FIG. 10.

First, the target torque limiting section 158 obtains the limit driving force corresponding to the lateral G acceleration detected by the lateral G acceleration sensor 134 from the limit load map 172 recorded in the recording section 140 (step S41).

Next, the target torque limiting section 158 obtains the load ratio of the front wheel 20 according to the amount of stroke of the front fork members 18 which amount of stroke is detected by the stroke sensor 132 (amount of compression of the hydraulic damper) from the front wheel load ratio map 174 (step S42). The larger the amount of stroke, the higher the load ratio of the front wheel 20. This is because the amount of stroke is increased as a heavier load is applied to the front wheel 20.

Next, the target torque limiting section 158 calculates the load ratio of the rear wheel 28 from the load ratio of the front wheel 20 (step S43). That is, the load ratio of the rear wheel 28 is calculated by subtracting the load ratio of the front wheel 20 from one.

Next, the target torque limiting section 158 calculates a lateral G driving force limit value from the limit driving force obtained in step S41 and the load ratio of the rear wheel 28 which load ratio is obtained in step S43 (step S44). Specifically, the lateral G driving force limit value is calculated by multiplying the limit driving force by the load ratio of the rear wheel 28.

Next, the target torque limiting section 158 determines whether the target torque T obtained in step S9 or step S10 of FIG. 7 is higher than the lateral G driving force limit value obtained in step S44 (step S45).

When the target torque T is not higher than the lateral G driving force limit value in step S45, the target torque limiting section 158 uses the target torque T obtained in step S9 or step S10 of FIG. 7 as it is without limiting the target torque T (step S46).

When the target torque T is higher than the lateral G driving force limit value in step S45, on the other hand, the target torque limiting section 158 limits the target torque T to the lateral G driving force limit value (step S47). That is, the lateral G driving force limit value is set as the target torque T. When the target torque T is higher than the lateral G driving force limit value, the grip of the rear wheel 28 is decreased, and therefore the target torque T is limited to the lateral G driving force limit value to be thereby able to secure a grip of the rear wheel 28. Thus, the output of the engine 106 can be controlled appropriately in the middle of a cornering run.

Figure 11:
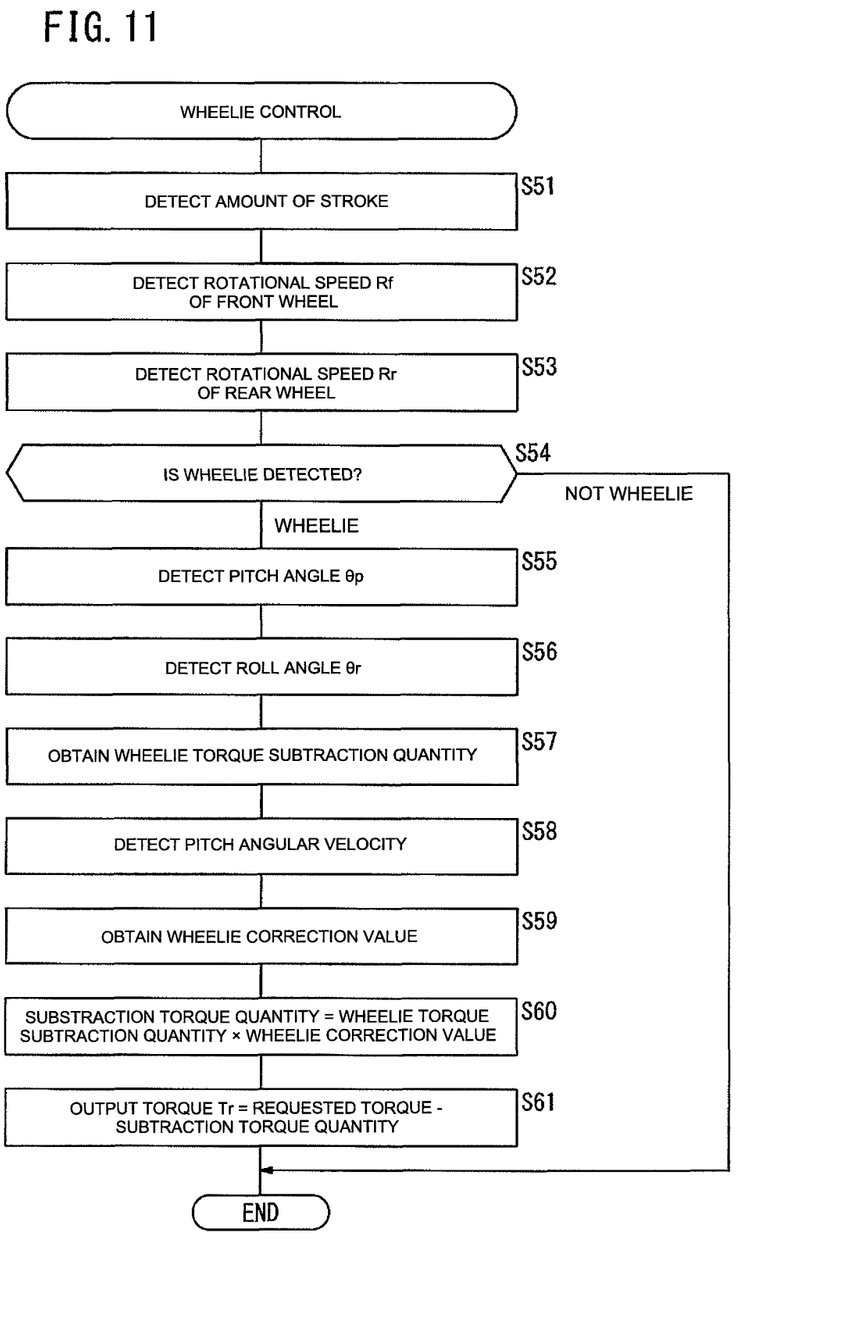
FIG. 11 is a flowchart depicting an operation of wheelie control.

The operation of wheelie control will next be described with reference to a flowchart of FIG. 11. Normally, the output torque Tr of the engine 106 is controlled to be a torque according to the opening degree θg of the throttle grip 37 (requested torque). When a wheelie is performed, wheelie control is performed so that the output torque Tr of the engine 106 is lower than the requested torque.

First, the wheelie control section 162 obtains the amount of stroke, the rotational speed Rf of the front wheel 20, and the rotational speed Rr of the rear wheel 28 that are detected by the stroke sensor 132, the front wheel vehicle speed sensor 118, and the rear wheel vehicle speed sensor 120, respectively, under control of the ECU 116 (steps S51 to S53).

Next, the wheelie control section 162 detects whether the motorcycle 12 is performing a wheelie on the basis of the amount of stroke, the rotational speed Rf of the front wheel 20, and the rotational speed Rr of the rear wheel 28 that are obtained in steps S51 to S53 (step S54). That is, the wheelie control section 162 detects that the motorcycle 12 is performing a wheelie when the amount of stroke is smaller than a certain value, the rotational speed Rf of the front wheel 20 is lower than the rotational speed Rr of the rear wheel 28, and a difference between the rotational speed Rr of the rear wheel 28 and the rotational speed Rf of the front wheel 20 is equal to or larger than a certain value. This is because when a wheelie is performed, the front wheel 20 is off the ground, and therefore the front fork members 18 are in an extended state and the rotational speed Rf of the front wheel 20 is decreased with respect to the rotational speed Rr of the rear wheel 28.

When a wheelie is detected in step S54, the wheelie control section 162 obtains the pitch angle θp and the roll angle θr that are detected by the pitch angle sensor 136 and the roll angle sensor 128, respectively, under control of the ECU 116 (steps S55 and S56).

Next, the wheelie control section 162 obtains a wheelie torque subtraction quantity according to the pitch angle θp and the roll angle θr from the wheelie torque subtraction quantity map 176 (step S57). The output torque Tr of the engine 106 is desirably reduced in a case of a large pitch angle θp and a large roll angle θr. Thus, the larger the pitch angle θp, the larger the wheelie torque subtraction quantity obtained, and the larger the roll angle θr, the larger the wheelie torque subtraction quantity obtained.

Next, the wheelie control section 162 detects a pitch angular velocity on the basis of the pitch angle θp detected by the pitch angle sensor 136 (step S58), and obtains a correction value according to the pitch angular velocity from the wheelie correction value map 178 (step S59).

Next, the wheelie control section 162 calculates a subtraction torque quantity by multiplying the wheelie torque subtraction quantity obtained in step S57 by the wheelie correction value obtained in step S59 (step S60).

Next, the wheelie control section 162 sets, as the output torque Tr of the engine 106, a value obtained by subtracting the subtraction torque quantity from the requested torque according to the opening degree θg of the throttle grip 37 which opening degree θg is detected by the throttle grip opening degree sensor 122 (step S61).

The ECU 116 controls the output of the engine 106 so as to generate the output torque Tr. For example, the ECU 116 controls the opening degree θg of the throttle grip 37, the ignition timing of the spark plug 110, and the amount of fuel injection of the injector 108.

As described above, the target slip ratio St is calculated on the basis of the roll angle θr of the motorcycle 12 and the opening degree θg of the throttle grip 37. Thus, the target slip ratio St can be calculated from parameters at a moment of operation by the driver. Therefore, traction control can be performed from the operation itself of the driver rather than from a change in state. As a result, quick control is made possible, a need for a control time to perform prediction from a change in state as in the past is eliminated, and traction control suitable for motorcycles suited to sports runs and race runs can be performed.

Because the slip ratio map 170 is recorded in the recording section 140 in a rewritable manner, traction control suiting the preferences of the owner can be performed, and drivability is improved.

In addition, the opening degree θth of the throttle valve 104 and the ignition timing are adjusted so as to generate the target torque T set from the target slip ratio St and the real slip ratio Sr. Thus, the output of the engine 106 can be adjusted automatically when only the target torque T is set. In addition, a share for the adjustment of the opening degree θth of the throttle valve 104 and a share for the adjustment of the ignition timing can be changed according to the conditions of the engine 106.

The target torque setting section 156 sets the target torque T using sliding mode control. Thus, resistance to disturbance is enhanced, and the target torque T can be set quickly.

In addition, in a power transmission system from the engine 106 to the rear wheel 28, there are effects of chain slack and backlash of transmission gears. The effects are great in a low transmission gear in which a high torque is generated. Therefore, in a case of a predetermined low transmission gear or a lower transmission gear of the automatic transmission 114, the target torque T can be set accurately when the target torque T is set by using engine rotational speed feedback control. Conversely, in a case of a high transmission gear in which high torque does not tend to be generated, the target torque T can be set accurately when the target torque T is set by using vehicle speed feedback control.

In addition, when the target torque T is higher than a lateral G acceleration limit value, the target torque T is limited to the lateral G acceleration limit value. Thereby appropriate output control can be performed in the middle of a cornering run. In addition, the output of the engine 106 can be controlled appropriately also in a case where traction control is performed when the motorcycle 12 is banked.

In addition, because the lateral G driving force limit value is set on the basis of the limit driving force based on the lateral G acceleration and the amount of stroke of the front fork members 18, the output of the engine 106 can be limited efficiently at a time of a cornering run.

The front wheel 20 is off the ground when a wheelie is performed. Thus, the subtraction torque quantity is determined according to the pitch angle θp, and the value obtained by subtracting the subtraction torque quantity from the requested torque is set as the output torque Tr. Therefore, the motorcycle 12 can be driven more desirably. In addition, because the subtraction torque quantity is calculated according to the pitch angle and the pitch angular velocity, the subtraction torque quantity can be determined suitably.

In addition, the traction control device 10 may have a plurality of slip ratio maps 170. In this case, the plurality of slip ratio maps 170 are set in advance according to a plurality of driving patterns different from each other. The ECU 116 uses a slip ratio map 170 selected by a driver among the plurality of slip ratio maps 170.

Specifically, the target slip ratio obtaining section 152 obtains the target slip ratio St using the slip ratio map 170 selected by the driver, and the execution determining section 154 and the target torque setting section 156 perform the above-described operation using the obtained target slip ratio St. Thus, even when one motorcycle 12 is shared by a plurality of people, traction control suiting the inclinations or preferences of each owner can be performed, and drivability is improved.

In addition, there may be similarly provided a plurality of limit load maps 172, a plurality of front wheel load ratio maps 174, a plurality of wheelie torque subtraction quantity maps 176, and a plurality of wheelie correction value maps 178 according to the operation patterns of drivers, and a limit load map 172, a front wheel load ratio map 174, a wheelie torque subtraction quantity map 176, and a wheelie correction value map 178 selected by a user may be used.

In addition, while maps are used to obtain the above-described values, the values may be obtained by calculation without using the maps.

The present invention has been described above using preferred embodiments thereof. The technical scope of the present invention, however, is not limited to the scope described in the foregoing embodiments. It is obvious to those skilled in the art that various changes and improvements can be made to the foregoing embodiments. It is apparent from the description of claims that forms resulting from such changes and improvements can be covered by the technical scope of the present invention. The reference numerals in parentheses provided in the claims are given in accord with the reference numerals in the accompanying drawings in order to facilitate understanding of the present invention, and the present invention should not be construed as being limited to the elements identified by those reference numerals.

We claim:

1. A traction control device for a motorcycle, said traction control device comprising:
   an engine driving force control unit for calculating a real slip ratio of a motorcycle, setting a target slip ratio according to a driving state of the motorcycle, and controlling a driving force of an engine so that the real slip ratio becomes the target slip ratio;
   a throttle grip position sensor for detecting a throttle opening degree of a throttle grip; and
   a bank angle sensor for detecting a bank angle of the motorcycle;
   wherein the engine driving force control unit is operable to calculate the target slip ratio based on the throttle opening degree and the bank angle of the motorcycle.

2. The traction control device according to claim 1, wherein:
   the engine driving force control unit includes a target torque setting unit for setting a target torque of the engine based on the target slip ratio and the real slip ratio, and
   an output torque of the engine is reduced to become the target torque, by adjusting an opening degree of an inlet valve disposed in an inlet path of the engine, and by adjusting an ignition timing of the engine, whereby traction control for making the real slip ratio converge to the target slip ratio is executed.

3. The traction control device according to claim 1, wherein a target value of the target slip ratio is set as a slip ratio based on a ratio between a rotational speed of a driven wheel and a rotational speed of a driving wheel, the target slip ratio is set by a map search using a slip ratio map having the throttle opening degree and the bank angle as parameters, and the slip ratio map is recorded in a memory of the engine driving force control unit in a rewritable manner.

4. The traction control device according to claim 3, wherein the target torque setting unit uses sliding mode control.

5. The traction control device according to claim 1,
   wherein the target torque setting unit has vehicle speed feedback control for calculating the target torque on a basis of a difference between the target slip ratio and the real slip ratio calculated on a basis of an estimated vehicle body speed and speed of a driving wheel and engine rotational speed feedback control for setting a target engine rotational speed on a basis of the target slip ratio and calculating the target torque on a basis of a difference between the target engine rotational speed and a real engine rotational speed, and
   one of the vehicle speed feedback control and the engine rotational speed feedback control is used according to a driving state of the motorcycle.

6. The traction control device according to claim 5, further comprising transmission gear sensor for detecting a currently engaged transmission gear,
   wherein the target torque setting unit uses the engine rotational speed feedback control when the transmission gear is a predetermined low gear or a lower gear.

7. The traction control device according to claim 1, further comprising a lateral acceleration sensor for detecting a lateral G acceleration of the motorcycle, wherein the engine driving force control unit sets a lateral G driving force limit value on a basis of the detected lateral G acceleration.

8. The traction control device according to claim 7, wherein the engine driving force control unit compares the target torque with the lateral G driving force limit value, and sets the target torque to the lateral G driving force limit value when the target torque is higher than the lateral G driving force limit value.

9. The traction control device according to claim 7, wherein the lateral G driving force limit value is determined on a basis of a limit driving force based on the lateral G acceleration and an amount of stroke of a front suspension.

10. The traction control device according to claim 1,
wherein the engine driving force control unit includes a wheelie detector for detecting a wheelie, and when a wheelie is performed, a subtraction torque quantity according to a pitch angle is subtracted from a torque requested by a user.

11. The traction control device according to claim 10, wherein the subtraction torque quantity is determined according to the pitch angle and a pitch angular velocity.

12. A traction control method for a motorcycle having an engine, an engine driving force control unit, a throttle grip position sensor, and a bank angle sensor, the method comprising:
detecting a throttle opening degree of a throttle grip from the throttle grip position sensor;
detecting a bank angle of the motorcycle from the bank angle sensor;
calculating a real slip ratio of the motorcycle based on the throttle opening degree and the bank angle of the motorcycle;
setting a target slip ratio according to a driving state of the motorcycle; and
controlling a driving force of the engine such that the real slip ratio converges with the target slip ratio.

13. The traction control method according to claim 12, further comprising:
setting a target torque of the engine based on the target slip ratio and the real slip ratio, and wherein the step of controlling the driving force of the engine such that the real slip ratio converges with the target slip ratio further includes:
reducing an output torque of the engine to converge with the target torque, wherein the step of reducing the output torque of the engine to converge with the target torque further includes:
adjusting an opening degree of an inlet valve disposed in an inlet path of the engine; and
adjusting an ignition timing of the engine.

14. The traction control method according to claim 12, further comprising setting a target value of the target slip ration based on a ratio between a rotational speed of a driven wheel and a rotational speed of a driving wheel, and wherein the step of setting the target slip ratio according to the driving state of the motorcycle includes searching a slip ratio map, which is recorded in a memory of the engine driving force control unit in a rewritable manner, having the throttle opening degree and the bank angle as parameters.

15. The traction control method according to claim 12, further comprising:
determining whether to use one of vehicle speed feedback control and engine rotational speed feedback control based on a driving state of the motorcycle;
calculating the target torque, when using vehicle speed feedback control, on a basis of a difference between the target slip ratio and the real slip ratio, which is calculated on a basis of an estimated vehicle body speed and speed of a driving wheel; and
calculating the target torque, when using engine rotational speed feedback control, on a basis of a difference between a target engine rotational speed and a real engine rotational speed, with the target engine rotational speed being set based on the target slip ratio.

16. The traction control method according to claim 15, wherein the step of determining whether to use one of vehicle speed feedback control and engine rotational speed feedback control based on the driving state of the motorcycle further includes determining to use the engine rotational speed feedback control when the transmission gear is a predetermined low gear or a lower gear according to a transmission gear sensor for detecting a currently engaged transmission gear.

17. The traction control method according to claim 12, further comprising:
detecting a lateral G acceleration of the motorcycle with a lateral acceleration sensor; and
setting a lateral G driving force limit value based on the detected lateral G acceleration.

18. The traction control method according to claim 17, further comprising:
comparing the target torque with the lateral G driving force limit value; and
setting the target torque to the lateral G driving force limit value when the target torque is higher than the lateral G driving force limit value.

19. The traction control method according to claim 12, further comprising:
detecting a wheelie with a wheelie detector; and
subtracting a subtraction torque quantity according to a pitch angle from a torque requested by a user upon detection of the wheelie.

20. The traction control method according to claim 19, further comprising:
determining the subtraction torque quantity according to the pitch angle and a pitch angular velocity.

* * * * *